Dec. 28, 1943.   H. J. BROWN   2,338,080
ELECTRICAL REGULATING SYSTEM
Filed July 17, 1942   2 Sheets-Sheet 1

INVENTOR.
BY Harold J. Brown
Woodling and Krost
attys

INVENTOR.
Harold J. Brown
BY
Woodling and Krost
attys

Patented Dec. 28, 1943

2,338,080

UNITED STATES PATENT OFFICE 2,338,080

ELECTRICAL REGULATING SYSTEM

Harold J. Brown, Indianapolis, Ind., assignor to Electronic Laboratories, Inc., a corporation of Indiana Application July 17, 1942, Serial No. 451,293

21 Claims. (Cl. 175—365)

My invention relates in general to electrical regulating systems and more particularly to vibrator operated electrical regulating systems.

An object of my invention is the provision of producing a substantially constant output voltage for relatively wide variations in the voltage of the direct current source which supplies energy to the vibrating system.

Another object of my invention is the provision of a vibrator converter system which has longer life, greater stability and reliability than previous systems.

Another object of my invention is the provision of an electrical network whose admittance characteristic is favorable to the operation of the vibrator.

Another object of my invention is the provision of an electrical network in combination with a vibrator converter system such that the current which is interrupted is small compared to the average current flowing throughout the cycle.

Another object of my invention is the provision of a vibrator converter system wherein the power factor may be maintained at substantially unity or slightly lagging in character.

Other objects and a fuller understanding of my invention may be had by referring to the following description and claims, taken in conjunction with the accompanying drawings, in which:

Figure 1:
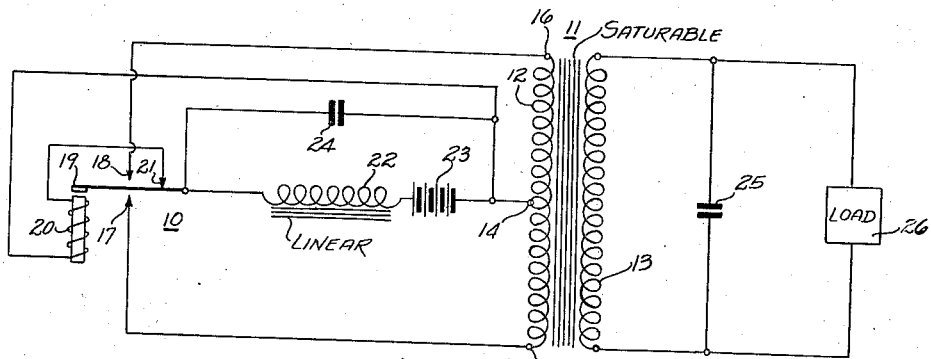
Figure 1 represents a diagrammatic illustration of a vibrator converter system embodying the features of my invention.

With reference to Figure 1 of the drawings, my invention comprises in general a vibrator 10, a transformer 11 having a split primary winding 12 and a secondary winding 13 which is arranged to supply the load 26. The vibrator 10 comprises two opposed contacts 17 and 18 between which a vibrating contact 19 is actuated by an actuating coil 20 controlled by an actuating contact 21. The vibrator 10 may be of any suitable form so long as it provides the necessary switching action. The primary winding 12 is provided with a center tap 14 which is connected to one side of a battery 23 which supplies direct current energy for operating the system. The other side of the battery 23 is connected to the vibrating contact 19 through a linear inductance 22. The end terminals 15 and 16 of the primary winding 12 are connected respectively to the opposed contacts 17 and 18 of the vibrator 10. A commutating condenser 24 is connected in shunt with the battery 23 and the linear inductance 22 to take the current during the off interval of the vibrator. A capacitor 25 is connected across the secondary winding 13 to draw a leading current to substantially oppose the lagging current in the saturable transformer 11.

In operation, my system provides for producing a substantially constant output voltage across the load 26 for relatively wide variations in the voltage of the direct current source. In the present drawings, I have illustrated a battery as being the source of direct current but it is to be understood that the source of direct current may include other sources than a battery. In connection with battery operated systems, it is to be noted that the voltage fluctuation of the battery voltage is much greater than that usually encountered in central station systems. Therefore, the problem of operating certain devices from batteries is more acute than the operation of the same device from a central station system. Accordingly, the need for regulation to obtain a substantially constant output voltage becomes greater for voltage regulated systems when they are battery powered.

With reference to Figure 1, it will be observed that the linear inductance 22 is effectively connected in series with a saturable inductance in the form of the saturable transformer 11. By virtue of the non-linear characteristic of the saturable transformer 11, fluctuations in the battery voltage 23 tend to appear across the linear inductance 22. This has the effect of maintaining a substantially constant voltage across the load as compared to the fluctuations of the input voltage of the battery. The capacitor 25 draws a leading current which is substantially equal to the lagging current drawn by the saturable transformer 11, with the result that the input current through the system is substantially in phase with the input voltage as provided by the vibrator. This in phase current decreases the burden of the system upon the vibrator 10. Inasmuch as the current is substantially in phase with the voltage provided by the vibrator, the current that is interrupted is small compared to the average current flowing throughout the cycle. In order to produce longer life and greater stability and reliability of the vibrator, the capacitor 25 is operated such that the system draws a slightly lagging current rather than a slightly leading current.

Figure 2:
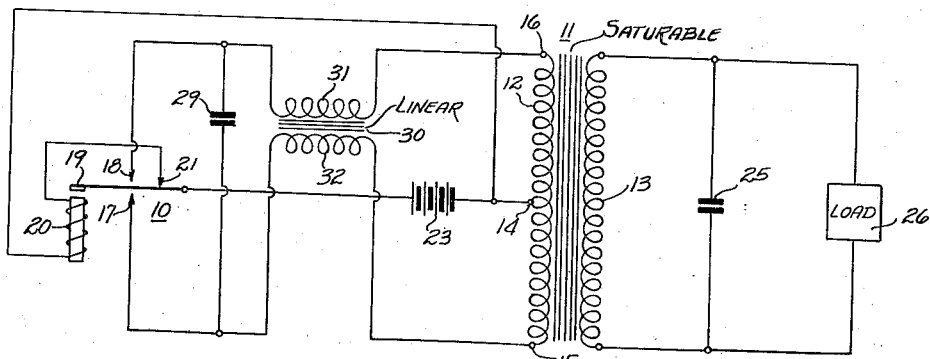
Figure 2 shows a vibrator converter system which is a modification of Figure 1.

The circuit in Figure 2 is similar to that in Figure 1 with the exception that the linear inductance 30 acts as a pure inductance in between the vibrator 10 and the saturable transformer 11.

In Figure 1 the linear inductance 22 is prevented from operating as a pure inductance by the presence of the commutating condenser 24 which admits or passes certain high frequency currents. The windings 31 and 32 upon the linear inductance 30 are equal and opposite windings on the common core of the linear inductance 30, thus permitting the condenser 29 across the opposed contacts 17 and 18 to operate as a buffer condenser. The operation of the circuit shown in Figure 2 is generally the same as that described with reference to Figure 1 and is arranged to produce a substantially constant output voltage across the load for wide variations in the voltage of the supply source for the battery 23.

Figure 3:
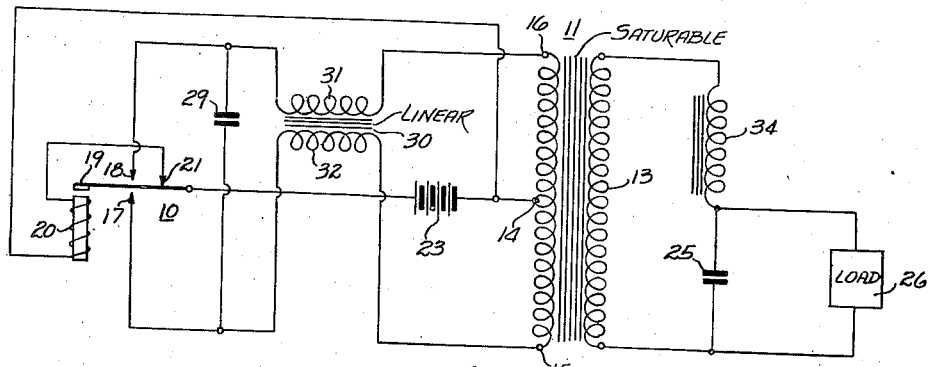
Figure 3 shows a further modified vibrator converter system.

Figure 3 is similar to Figure 2 except that there is added a harmonic suppressing inductance 34 connected in series with the capacitor 25. The harmonic suppressing inductance 34 is substantially linear and prevents the circulation of harmonics generated by the non-linear magnetic core in the saturable transformer.

Figure 4:
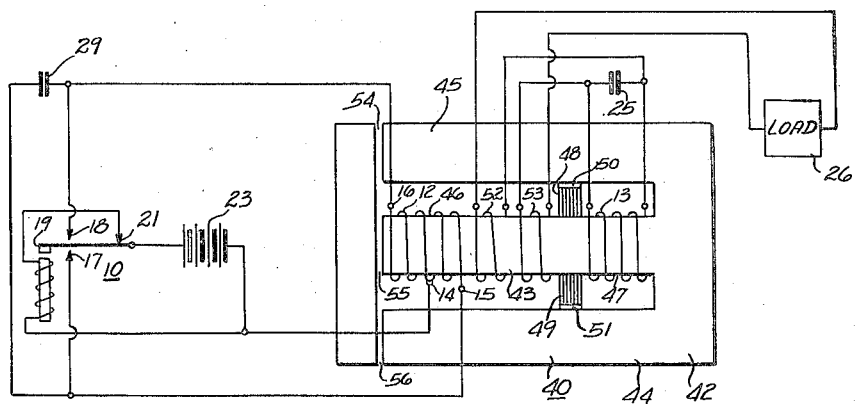
Figure 4 shows a still further modified form of my vibrator converter system.
Figure 5:
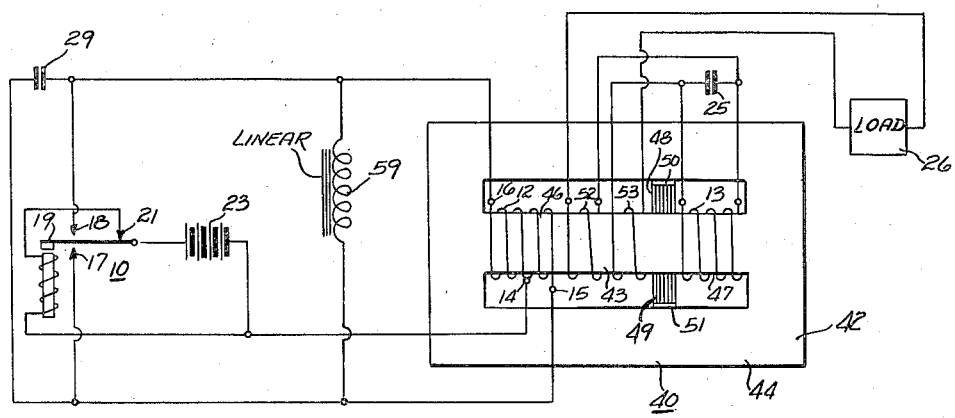
Figure 5 shows an arrangement substantially the same as shown in Figure 4, but includes a modification thereof.

Figure 4 represents a consolidation of the electrical network elements of Figure 3 into a single transformer. The single transformer is indicated by the refreence character 40 and comprises a core 42 having a center leg 43 and two outside legs 44 and 45. The primary winding 12 of the system is mounted around the center leg 43 on the left-hand end thereof as shown and the secondary winding 13 is also mounted around the center leg upon the right-hand end thereof as shown. The portion of the core under the primary winding is indicated by the reference character 46 and will be referred to as the primary core portion and the portion of the core under the secondary winding 13 is identified by the reference character 47 and will be referred to as the secondary core portion. A magnetic shunt 48 is placed between the center leg 43 and the outside leg 44 between the primary core portion and the secondary core portion and similarly a magnetic shunt 49 is positioned between the center leg 43 and the outside leg 45 between the primary core portion and the secondary core portion. The magnetic shunts 48 and 49 are provided, respectively, with air gaps 50 and 51. The primary flux flows through the center leg 43 and then to the outside legs 44 and 45 back to the center leg. An air gap is provided in the path of the primary flux and as illustrated comprises the air gaps 54, 55 and 56. While I have shown three air gaps, it is to be understood that the air gaps may be consolidated into a single air gap in the primary flux path. The secondary current flowing in the condenser 25 creates in the secondary winding a magnetomotive force which creates an additional flux in the secondary core portion 47. This additional flux produced by the secondary current flowing through the condenser 25 together with the primary flux causes a saturation of the secondary core portion and consequently a restriction on the amount of flux which may thread the secondary winding 13. In order that a high flux density may exist in the secondary core portion over and above that existing in the primary core portion, the additional flux must pass through the magnetic shunts 48 and 49. Therefore, a component of current will tend to be induced in the primary winding which will be leading with respect to the impressed voltage. In my transformer arrangement, the leading current which is tended to be induced into the primary winding will be prevented because of the assistance of the air gap in the primary flux path. The air gap in the primary flux path has the property of correcting for power factor in the system with respect to the primary winding. Because of the presence of the capacitor 25 which is required to produce the secondary flux through the shunts 48 and 49, the transformer inherently tends to draw a leading current in the primary winding, but in my invention I prevent this leading current from flowing by the presence of the air gap in the primary flux path without in any way affecting the performance of the regulating portion of the system. This leading current is harmful in a vibrator converter system, otherwise the voltage reversal of the condenser 29 cannot occur in the off-contact interval of the operated cycle. With the correction of the power factor of the transformer assembly and with the current drawn by the transformer in phase with the implied voltage and relatively free from higher harmonics, my invention has the effect of reducing the current required at the instant of the breaking-interval of the vibrator. Consequently, the current drawn at the breaking-interval of the vibrator is small relative to the average current drawn throughout the entire cycle. This has the property of increasing the life and the stability and reliability of the converter circuit. The presence of the air gap in the primary flux path allows me to convert an otherwise unsuitable transformer and condenser assembly into a completely suitable one for vibrator operation. It also reduces the current requirements of the primary winding and obviates the need for the addition of extra elements. An example of an extra element to correct power factor is shown in Figure 5 by the auxiliary inductance 59 which is connected in parallel with the primary windings and which must draw sufficient lagging current to compensate for the leading current drawn by the primary winding resulting from the presence of the condenser 25 across the secondary winding. The core in Figure 5 accordingly has no air gap in the primary flux path.

The degree of voltage regulation obtained by the proper saturation of the secondary core portion 47 is in most instances sufficient to provide adequate voltage regulation for devices to be operated from a normally variable battery source. However, if complete voltage regulation is required at a sacrifice of efficiency, a bucking winding 52 and 53 may be incorporated in series with the secondary output circuit to the load as shown in Figures 4 and 5 of the drawings. These bucking windings will usually have approximately from 5 to 15% of the total secondary voltage. The bucking windings effectively produce a voltage proportional to the primary in series opposition to the secondary voltage with the result that excellent regulation may be obtained.

Although I have described my invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

I claim as my invention:

1. In an inverter system having means for producing a pulsating current from a direct current source, the improvement of producing a substantially constant output voltage for relatively wide variations in the voltage of the direct current source, said improvement comprising, in combination, a saturable inductance, a substantially linear inductance, means for connecting the said inductances in series and magnetizing them by said pulsating current, output means receiving load energy from the saturable inductance, and a capacitor element in parallel with the saturable inductance to draw a leading current to substantially oppose the lagging current in the saturable inductance, said linear inductance having two substantially equal windings through which the said pulsating current alternately passes upon flowing to the said saturable inductance.

2. In an inverter system having means for producing a pulsating current from a direct current source, the improvement of producing a substantially constant output voltage for relatively wide variations in the voltage of the direct current source, said improvement comprising, in combination, a saturable inductance, a substantially linear inductance, means for energizing the said inductances from the said pulsating current and coupling them so that the said linear inductance is effectively in series with the saturable inductance, output means receiving load energy from the saturable inductance, and a capacitor element in parallel with the saturable inductance to draw a leading current to substantially oppose the lagging current in the saturable inductance, said linear inductance having two substantially equal windings through which the said pulsating current alternately passes upon flowing to the said saturable inductance.

3. In an inverter system having means for producing a pulsating current from a direct current source, said system including a vibratory interrupter having oppositely disposed contact means and vibrating contact means therebetween, the improvement of producing a substantially constant output voltage for relatively wide variations in the voltage of the direct current source, said improvement comprising, in combination, a saturable transformer having split primary winding means with two ends and a center tap and secondary winding means supplying an alternating current, said center tap being connected to one side of the direct current source and said vibrating contact means being connected to the other side of the direct current source, a first inductance means, a second inductance means, one of said oppositely disposed contact means of the interrupter being connected through the first inductance means to one end of the primary winding means and the other said oppositely disposed contact means being connected through the second inductance means to the other end of the primary winding means, and a capacitor in parallel with the saturable transformer to draw a leading current to substantially oppose the lagging current in the saturable transformer, said first inductance means and said second inductance means having a common core and being polarized to substantially nullify unidirectional flux in said common core.

4. In an inverter system having means for producing a pulsating current from a direct current source, said system including a vibratory interrupter having oppositely disposed contact means and vibrating contact means therebetween, the improvement of producing a substantially constant output voltage for relatively wide variations in the voltage of the direct current source, said improvement comprising, in combination, a saturable transformer having split primary winding means with two ends and a center tap and secondary winding means supplying an alternating current, said center tap being connected to one side of the direct current source and said vibrating contact means being connected to the other side of the direct current source, a first inductance means, a second inductance means, one of said oppositely disposed contact means of the interrupter being connected through the first inductance means to one end of the primary winding means and the other said oppositely disposed contact means being connected through the second inductance means to the other end of the primary winding means, and a capacitor in parallel with the saturable transformer to draw a leading current to substantially oppose the lagging current in the saturable transformer, said inductance means having a common core.

5. In a vibrating system having two opposed contact means with vibrating contact means operating therebetween energized by a direct current source and producing a pulsating current, the improvement of producing a substantially constant output voltage for relatively wide variations in the voltage of the direct current source, said improvement comprising, in combination, a magnetizable core having a primary portion and a secondary portion, a primary winding on the primary core portion, said primary winding having end connections connected to said opposed contact means and a center tap connected to one side of the direct current source with the other side of the direct current source connected to the vibrating contact means, a secondary winding on the secondary core portion, said secondary core portion and said primary core portion being separated by magnetic shunt means having an air gap, capacitor means connected with the secondary winding, said capacitor means in combination with the secondary winding producing a secondary flux condition which adds to the primary flux condition to saturate the secondary core, output circuit means connected with the secondary winding and giving a substantially constant voltage for variations in the voltage of the direct current source, said primary core portion having an air gap to prevent leading current from appearing in the primary winding.

6. In a vibrating system having two opposed contact means with vibrating contact means operating therebetween energized by a direct current source and producing a pulsating current, the improvement of producing a substantially constant output voltage for relatively wide variations in the voltage of the direct current source, said improvement comprising, in combination, a magnetizable core having a primary portion and a secondary portion, a primary winding on the primary core portion, said primary winding having end connections connected to said opposed contact means and a center tap connected to one side of the direct current source with the other side of the direct current source connected to the vibrating contact means, a secondary winding on the secondary core portion, said secondary core portion and said primary core portion being separated by magnetic shunt means having an air gap, capacitor means connected with the secondary winding, said capacitor means in combination with the secondary winding producing a secondary flux condition which adds to the primary flux condition to saturate the secondary core, output circuit means connected with the secondary winding and giving a substantially constant voltage for variations in the voltage of the direct current source, said primary core portion having an air gap of such size to cause lagging current to appear in the primary winding.

7. In a vibrating system having two opposed contact means with vibrating contact means operating therebetween energized by a direct current source and producing a pulsating current, the improvement of producing a substantially constant output voltage for relatively wide variations in the voltage of the direct current source, said improvement comprising, in combination, a magnetizable core having a primary portion and a secondary portion, a primary winding on the primary core portion, said primary winding having end connections connected to said opposed contact means and a center tap connected to one side of the direct current source with the other side of the direct current source connected to the vibrating contact means, a secondary winding on the secondary core portion, said secondary core portion and said primary core portion being separated by magnetic shunt means having an air gap, capacitor means connected with the secondary winding, said capacitor means in combination with the secondary winding producing a secondary flux condition which adds to the primary flux condition to saturate the secondary core, output circuit means connected with the secondary winding and giving a substantially constant voltage for variations in the voltage of the direct current source, and an auxiliary inductance in parallel with the primary winding to draw a lagging current to oppose the leading current induced in the primary winding resulting from the action of the capacitor means.

8. In a vibrating system having two opposed contact means with vibrating contact means operating therebetween energized by a direct current source and producing a pulsating current, the improvement of producing a substantially constant output voltage for relatively wide variations in the voltage of the direct current source, said improvement comprising, in combination, a magnetizable core having a primary portion and a secondary portion, a primary winding on the primary core portion, said primary winding having end connections connected to said opposed contact means and a center tap connected to one side of the direct current source with the other side of the direct current source connected to the vibrating contact means, a secondary winding on the secondary core portion, said secondary core portion and said primary core portion being separated by magnetic shunt means having an air gap, capacitor means connected with the secondary winding, said capacitor means in combination with the secondary winding producing a secondary flux condition which adds to the primary flux condition to saturate the secondary core, output circuit means connected with the secondary winding and giving a substantially constant voltage for variations in the voltage of the direct current source, and means to produce a lagging current to oppose the leading current induced in the primary winding resulting from the action of the capacitor.

9. In combination with a vibratory inverter having opposed contacts adapted to be alternately connected through a vibrating member to a source of direct current, a first transformer with a substantially linear excitation characteristic and having two substantially equal windings, a second transformer having a saturable core and a center-tapped winding, the center tap of said second transformer being connected to said source of direct current, the ends of said center-tapped winding being connected to said opposed contacts, one through each of the equal windings of said first transformer, a capacitor connected in shunt relationship with said second transformer, and circuit means for supplying alternating current to a load substantially in shunt relationship with said second transformer.

10. An inverter adapted to be energized from a source of direct current and to supply alternating current to a load, comprising, in combination, saturable inductance means arranged substantially in parallel circuit relationship with said load, capacitive means arranged in parallel circuit relationship with the saturable inductance means, contacting means adapted to induce alternating voltage in said saturable inductance means from the source of direct current, substantially linear inductance means adapted to carry the exciting current of said saturable means and said capacitive means and to produce a voltage adding vectorially to the voltage commutated by said contacting means and maintaining a substantially constant voltage across said load in spite of variations in the voltage of said direct current source said linear inductance means having two substantially equal windings through which the direct current from said source alternately passes upon flowing to the said saturable inductance means.

11. In combination with a source of direct current and commutating means energized from said source to supply a pulsating direct current, a substantially linear inductive element, a saturable inductive element having a winding, a capacitor, circuit means connecting the linear inductive element substantially in series circuit relationship between the commutating means and said saturable inductive element, said circut means supplying the pulsating direct current from said source to at least a portion of the winding of the saturable inductive element, the capacitor being arranged substantially in parallel with the saturable inductive element, and output means for supplying alternating current to a load substantially in parallel with said saturable inductive element, said linear inductive element means having two substantially equal winding through which the said pulsating current from said source alternately passes upon flowing to the said saturable inductive element.

12. An inverter for supplying substantially constant potential alternating current when energized from a variable voltage source of direct current, comprising in combination, a pole changer having opposing contacts adapted to be alternately connected to the source of direct current through a contacting member connected to said source, a first capacitor connected across said opposed contacts, a saturable inductive element having two windings, one energized from each of said opposed contacts, a linear inductive element having two windings, one energized from each of said opposed contacts, a second capacitor connected in parallel with said saturable inductive element, and output means in parallel with the saturable inductive element.

13. In combination, saturable inductance means, capacitive means, and linear inductance means, means for supplying pulsations of direct current to the saturable inductance through the linear inductance means, circuit means connecting said capacitive means in parallel with said saturable inductance means, and output means for supplying alternating current to a load substantially in parallel with the saturable inductance means, said linear inductance means having two substantially equal windings through which the said pulsations of direct current alternately pass upon flowing to the said saturable inductance means.

14. In combination with a source of direct current, commutating means for producing pulses of direct current, a saturable inductive element having two winding portions, each connected to said commutating means and receiving alternate direct current pulses, the two winding portions being oppositely polarized so that the direct current pulses through one portion produce flux opposite and substantially equal to that produced by the direct current pulses through the other portion, a substantially linear inductive element having two windings connected between said commutating means and said saturable inductive element, each of the two windings on said linear element being connected to one of the two winding portions on the saturable element and being oppositely polarized so that the direct current pulses through one winding produce flux opposite and substantially equal to the direct current pulses through the other winding, a capacitor connected in parallel with said saturable inductive element and output means for supplying alternating current to a load.

15. In combination with interrupting means for supplying a pulsating direct current, a linear transformer having a first and a second winding, a saturable transformer having a first and a second winding, a capacitor in shunt with said saturable transformer, first circuit means for connecting the said first winding of each said transformer in series with each other and with the interrupting means, second circuit means for connecting the said second winding of each said transformer in series with each other and with the interrupting means, said second windings of the transformers substantially nullifying the unidirectional flux induced in the transformers by the said first windings, and output load circuit connected to the saturable transformer.

16. A transformer comprising, in combination, a magnetic core including at least a first longitudinal core portion and a second longitudinal core portion, said first and said second longitudinal core portions being spaced apart, said first longitudinal core portion having a primary core region and a secondary core region, a primary winding surrounding the primary core region, a secondary winding surrounding the secondary core region, magnetic shunt means between the primary winding and the secondary winding, said magnetic shunt means being disposed between the first and second longitudinal core portions, a capacitor across the secondary winding which cooperates with the secondary winding to produce a secondary flux in addition to the primary flux to saturate the secondary core region, said magnetic core having an air gap across which the primary flux passes to prevent a leading current from being induced in the primary winding.

17. In an electrical system having a direct current source and having interrupting means for producing a pulsating current to energize the system, the improvement of producing a substantially constant output voltage with relatively large variations in the direct current source, comprising, in combination, a magnetic core including at least a first longitudinal core portion and a second longitudinal core portion, said first and said second longitudinal core portions being spaced apart, said first longitudinal core portion having a primary core region and a secondary core region, a primary winding energized by the pulsating current and surrounding the primary core region, a secondary winding surrounding the secondary core region, magnetic shunt means between the primary winding and the secondary winding, said magnetic shunt means being disposed between the first and second longitudinal core portions, a capacitor across the secondary winding which cooperates with the secondary winding to produce a secondary flux in addition to the primary flux to saturate the secondary core region, said magnetic core having an air gap across which the primary flux passes to prevent a leading current from being induced in the primary winding, output circuit means connected with the secondary winding and giving a substantially constant voltage for variations in the voltage of the direct current source.

18. In combination with a vibratory inverter operated from direct current, a linear transformer having a plurality of windings, a saturable transformer, a capacitor, a plurality of circuit connections between the vibrating inverter and the saturable transformer, said capacitor shunting said saturable transformer, each of said circuit connections including therein respectively a winding of the linear transformer, said windings on the linear transformer being polarized to substantially nullify any unidirectional flux in said linear transformer.

19. A circuit for obtaining a substantially constant alternating current output voltage from a variable voltage direct current source comprising, in combination, commutating means, a saturable transformer, output means connected to said saturable transformer, a capacitor, and a linear transformer having a plurality of windings, said capacitor being connected in shunt relationship with said saturable transformer, a plurality of circuit connections between the commutating means and the saturable transformer, each of said circuit connections including therein respectively a winding of the linear transformer.

20. In combination with an interrupting means operated from direct current, a linear transformer having a plurality of windings, a saturable transformer, a capacitor, a plurality of circuit connections between the interrupting means and the saturable transformer, said capacitor shunting said saturable transformer, each of said circuit connections including therein, respectively, a winding of the linear transformer, said windings on the linear transformer being polarized to substantially nullify any unidirectional flux in said linear transformer.

21. A circuit for obtaining a substantially constant alternating current output voltage from a variable voltage direct current source comprising, in combination, interrupting means connected with the direct current source for producing pulsating current, a saturable transformer, output means connected to said saturable transformer, a capacitor, and a linear transformer having a plurality of windings, said capacitor being connected in shunt relationship with said saturable transformer, a plurality of circuit connections between the interrupting means and the saturable transformer, each of said circuit connections including therein respectively a winding of the linear transformer.

HAROLD J. BROWN.